United States Patent
Ko et al.

(10) Patent No.: US 10,486,657 B2
(45) Date of Patent: Nov. 26, 2019

(54) PUMP FOR INTEGRATED BRAKE SYSTEM

(71) Applicant: MANDO CORPORATION, Gyeonggi-do (KR)

(72) Inventors: Weon Chan Ko, Gyeonggi-do (KR); Jin Seok Kim, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 544 days.

(21) Appl. No.: 15/053,949

(22) Filed: Feb. 25, 2016

(65) Prior Publication Data

US 2016/0251007 A1 Sep. 1, 2016

(30) Foreign Application Priority Data

Feb. 26, 2015 (KR) .................. 10-2015-0027519

(51) Int. Cl.
*B60T 1/10* (2006.01)
*B60T 7/04* (2006.01)
(Continued)

(52) U.S. Cl.
CPC .............. *B60T 7/042* (2013.01); *B60T 1/10* (2013.01); *B60T 13/745* (2013.01); *B60T 17/02* (2013.01);
(Continued)

(58) Field of Classification Search
CPC ........ B60T 7/042; B60T 13/745; B60T 17/02; B60T 1/10; F04B 9/02; F04B 17/03;
(Continued)

(56) References Cited

U.S. PATENT DOCUMENTS 3,407,543 A * 10/1968 Gebel .................. B24B 47/04
451/24
4,119,017 A * 10/1978 Nusbaumer ......... F15B 15/1414
92/108
(Continued)

FOREIGN PATENT DOCUMENTS

CN 203926862 U * 11/2014
CN 105221614 1/2016
(Continued)

OTHER PUBLICATIONS

Office Action dated Nov. 28, 2018 for Chinese Application No. 201610190480.1 and its English machine translation by Google Translate.
(Continued)

*Primary Examiner* — Devon C Kramer
*Assistant Examiner* — Christopher J Brunjes
(74) *Attorney, Agent, or Firm* — Ladas & Parry, LLP

(57) ABSTRACT

Disclosed herein is a pump of an integrated brake system. The pump includes a motor, a gear unit which converts a rotating force of the motor into linear reciprocating movement, a piston assembly which is connected to the gear unit and reciprocates based on power conversion of the gear unit, a piston housing which accommodates the piston assembly, and a fixed rod fixedly disposed in the piston housing in a longitudinal direction. Here, the piston assembly includes a coupling groove formed therein, into which the fixed rod is inserted.

14 Claims, 5 Drawing Sheets

(51) Int. Cl.
  *F04B 9/02*   (2006.01)
  *B60T 13/74*  (2006.01)
  *B60T 17/02*  (2006.01)
  *F04B 17/03*  (2006.01)
  *F04B 35/01*  (2006.01)
  *F04B 53/14*  (2006.01)

(52) U.S. Cl.
  CPC ............... *F04B 9/02* (2013.01); *F04B 17/03* (2013.01); *F04B 35/01* (2013.01); *F04B 53/146* (2013.01)

(58) Field of Classification Search
  CPC ........ F04B 35/01; F04B 53/146; F15B 15/06; F15B 15/14
  USPC ....... 417/415; 188/156, 157; 92/32, 165 PR; 74/840, 841, 842, 22 A
  See application file for complete search history.

(56) References Cited

U.S. PATENT DOCUMENTS

| | | | | |
|---|---|---|---|---|
| 5,042,885 | A * | 8/1991 | Villec | B60T 8/4225 303/115.2 |
| 6,230,492 | B1 * | 5/2001 | Kingston | B60T 13/745 60/545 |
| 6,263,778 | B1 * | 7/2001 | Brass | F01B 15/007 222/390 |
| 2005/0042111 | A1 * | 2/2005 | Zaiser | F04B 9/02 417/225 |

FOREIGN PATENT DOCUMENTS

| | | | | |
|---|---|---|---|---|
| DE | 202015105391 | U1 * | 10/2015 | B23G 1/18 |
| DE | 102014212417 | A1 * | 12/2015 | F04B 9/02 |
| KR | 10-2005-0004279 | | 1/2005 | |

OTHER PUBLICATIONS

Notification to Grant dated Mar. 29, 2019 for Chinese Application No. 201610190480.1 and its English translation from Global Dossier.

* cited by examiner

FIG. 2
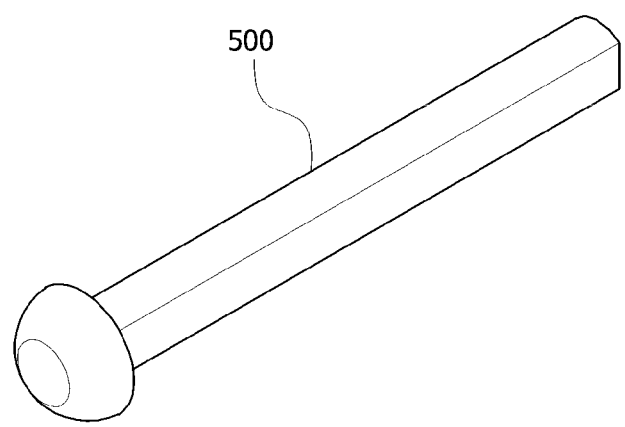
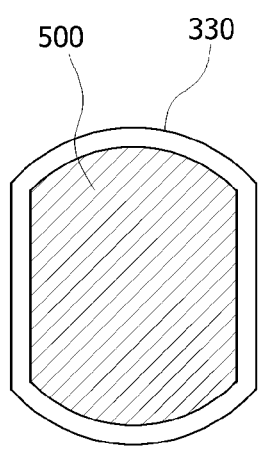
FIG. 3(a)
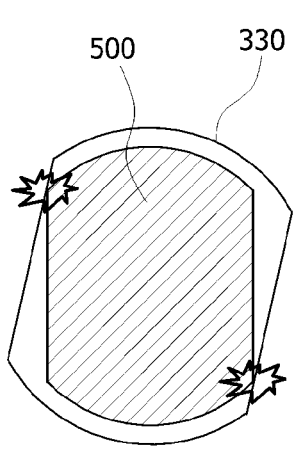
FIG. 3(b)

FIG. 4
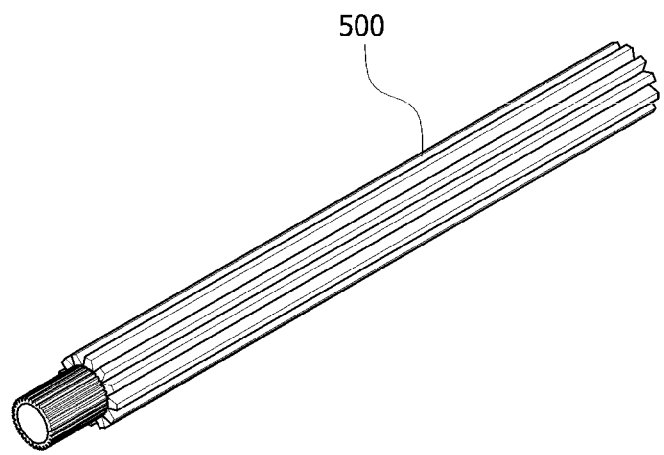
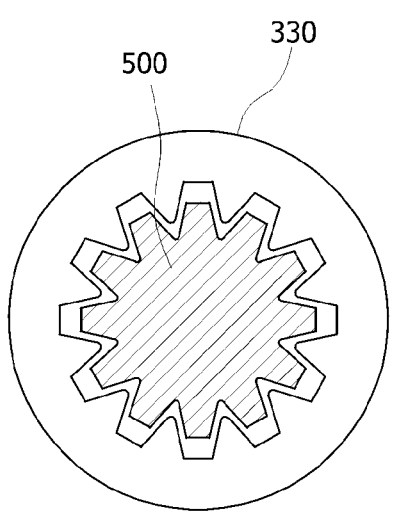
FIG. 5(a)
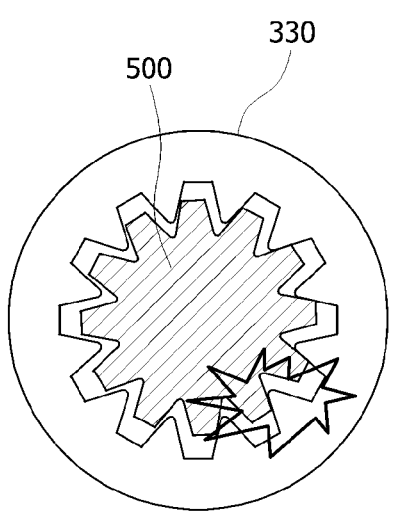
FIG. 5(b)

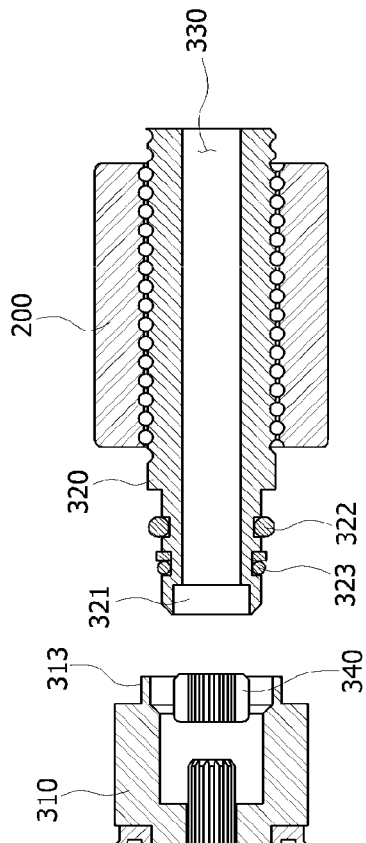
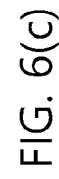
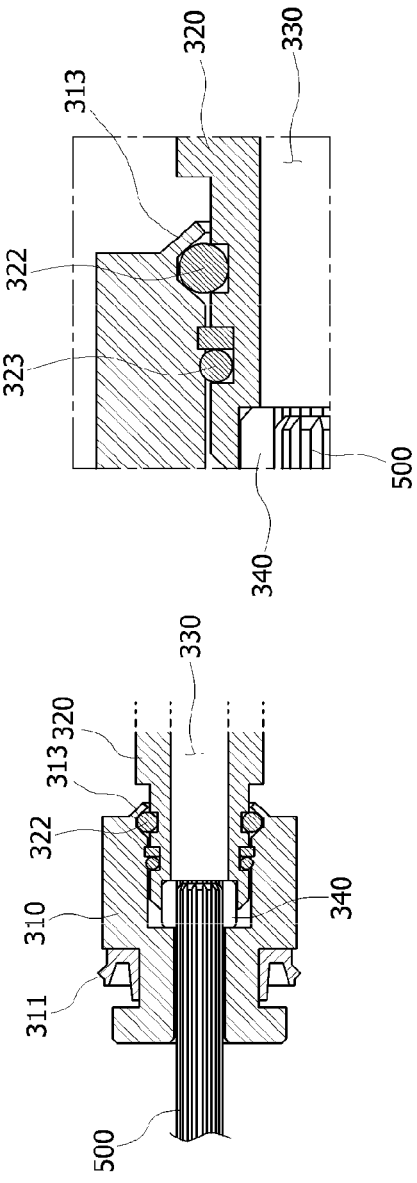
FIG. 6(a)
FIG. 6(b)
FIG. 6(c)

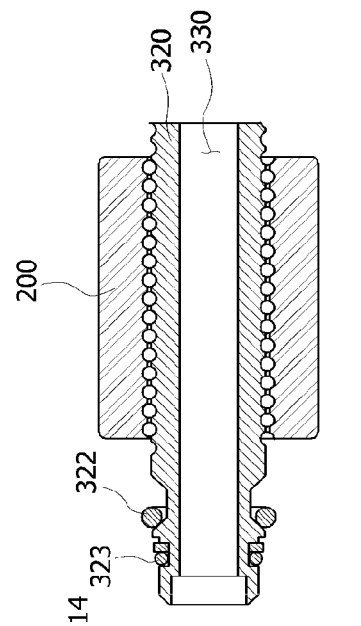
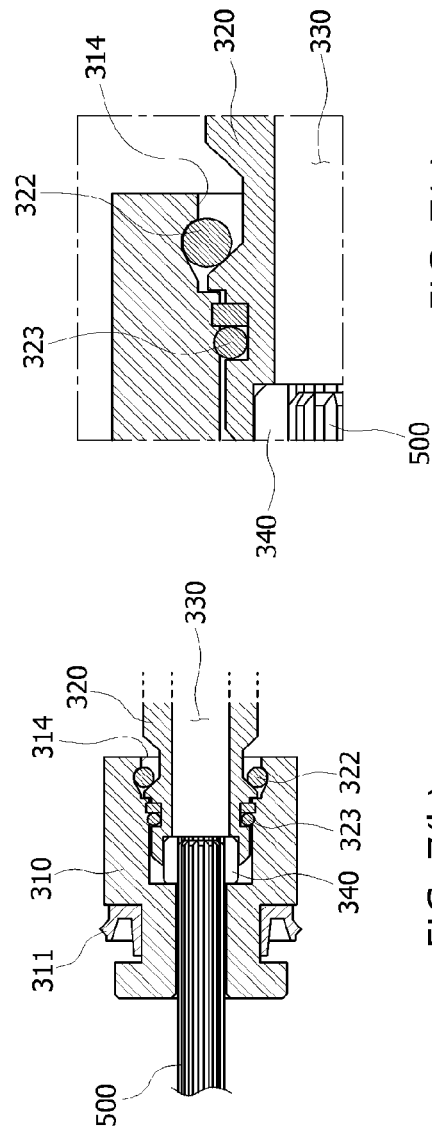
FIG. 7(a)
FIG. 7(b)
FIG. 7(c)

PUMP FOR INTEGRATED BRAKE SYSTEM

CROSS-REFERENCE TO RELATED APPLICATION

This application claims priority to and the benefit of Korean Patent Application No. 10-2015-0027519, filed on Feb. 26, 2015, the disclosure of which is incorporated herein by reference in its entirety.

BACKGROUND

1. Field of the Invention

The present invention relates to a pump of an integrated brake system, and more particularly, to a pump applied to an integrated brake system, which generates a braking pressure using an electric motor as a power source depending on a brake pedal operation of a driver and vehicle conditions.

2. Discussion of Related Art

Recently, to increase fuel efficiency and to reduce emissions, hybrid vehicles, fuel cell vehicles, electric vehicles, etc. have been vigorously developed. These vehicles essentially include brakes, that is, brakes of brake systems installed therein. Here, a brake for a vehicle indicates a device which reduces a speed of a traveling vehicle or stops the vehicle.

General brakes of brake systems for vehicles include vacuum brakes which generate a braking force using suction pressure of an engine and hydraulic brakes which generate a braking force using hydraulic pressure.

Vacuum brakes are devices which provide a great braking force with a small force using a pressure difference between suction pressure of a vehicle engine and atmospheric pressure in a vacuum booster. That is, it is a device which generates an output much greater than a force applied to a pedal when a driver presses the pedal.

In conventional vacuum brakes described above, it is necessary to supply suction pressure of a vehicle engine to a vacuum booster to form a vacuum and thus fuel efficiency is reduced. Also, even when a vehicle stops, it is necessary to constantly drive an engine to form a vacuum. Also, since fuel cell vehicles and electric vehicles do not include an internal combustion engine, it is impossible to apply conventional vacuum brakes which amplify a pedal effort of a driver during braking. In case of hybrid vehicles, in order to increase fuel efficiency, it is necessary to provide an idling stop function when a vehicle stops. Accordingly, it is necessary to apply hydraulic brakes.

That is, as described above, it is necessary to perform regenerative braking to increase fuel efficiency in all vehicles. However, when a hydraulic brake is applied, the regenerative braking is easily performed.

Meanwhile, an electro-hydraulic brake system, a hydraulic type brake, is a brake system in which when a driver presses a pedal, an electronic control unit senses it and supplies hydraulic pressure to a master cylinder, thereby transferring braking hydraulic pressure to each wheel and generating a braking force.

Recently, integrated brake systems in which a pump, a control unit, and a valve which form an electro-hydraulic brake system are integrated in one module have been developed. Since the integrated brake systems described above are formed by integrating necessary units as one, products have large sizes and are inconvenient to be mounted in vehicles.

The following prior art document discloses a structure for preventing rotation of a ball screw bar of a steering device for a vehicle, in which the ball screw bar is restrained from rotating together with a motor when the motor rotates to prevent wheels from being degraded in performance but does not disclose technical features of the present invention.

PRIOR ART DOCUMENT

Patent Document

Korean Patent Publication No. 10-2005-0004279

SUMMARY OF THE INVENTION

The present invention is direct to a pump of an integrated brake system, capable of increasing the degree of freedom in design of a vehicle by reducing a length of a cylinder in which a piston reciprocates.

The present invention is also directed to a pump of an integrated brake system, capable of being precisely controlled by allowing rotational movement of a motor to be reflected in linear movement of a piston.

The aspects of the present invention are not limited to the above description. Additional aspects of the invention will be set forth in part in the description which follows and, in part, will be obvious from the description, or may be learned by practice of the invention.

According to an aspect of the present invention, there is provided a pump of an integrated brake system. The pump includes a motor, a gear unit which converts a rotating force of the motor into linear reciprocating movement, a piston assembly which is connected to the gear unit and reciprocates based on power conversion of the gear unit, a piston housing which accommodates the piston assembly, and a fixed rod fixedly disposed in the piston housing in a longitudinal direction. Here, the piston assembly includes a coupling groove formed therein, into which the fixed rod is inserted.

The piston housing may include a through hole formed in an end thereof to allow the fixed rod to be inserted thereinto and coupled therewith. A portion of the fixed rod which passes through the through hole and is exposed may be coupled with a fixing member to fix the fixed rod.

A cross section of the fixed rod may be formed in a polygonal shape, and the coupling groove may be formed corresponding to the cross section of the fixed rod.

A hollow may be formed in the motor, the gear unit may include a nut which is restricted by and coupled with a rotor of the motor and rotates based on rotation of the rotor, and the piston assembly may be disposed in the nut and may reciprocate based on rotation of the nut.

The pump may further include a motor housing which accommodates the motor and a four-point contact bearing disposed between the motor housing and the rotor.

The motor housing and the piston housing may be assembled based on a position of the four-point contact bearing.

The piston assembly may include a piston head which reciprocates in a cylinder formed in the piston housing and a spindle which has one side inserted into and coupled with an insertion groove formed in one side of the piston head and is screw-coupled with the nut. Also, a ring member may be disposed on an outer circumferential surface of the spindle.

A holding protrusion may be formed on an inner circumferential surface of the piston head, and the spindle may be inserted into the insertion groove until the ring member is held by the holding protrusion and then coak-coupled with one side of the piston head to fix the spindle to the piston head.

A holding groove may be formed in an inner circumferential surface of the piston head, and the spindle may be inserted into the insertion groove until the ring member is held by the holding groove to fix the spindle to the piston head.

The piston assembly may further include a rotation-preventing plate disposed in the insertion groove and formed corresponding to the fixed rod. Also, the spindle may include an accommodation groove formed in one side thereof, which accommodates the rotation-preventing plate.

The gear unit may include a worm shaft coaxially connected to a rotating shaft of the motor, a worm wheel which is engaged with the worm shaft and rotates based on rotation of the worm shaft, a pinion disposed coaxially with the worm wheel, and a rack bar which is engaged with the pinion and linearly reciprocates based on rotation of the pinion.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 2 is a perspective view illustrating an example of a fixed rod among components of the pump of the integrated brake system in accordance with one embodiment of the present invention;

FIGS. 3(a) and 3(b) are cross-sectional views of the fixed rod shown in FIG. 2;

FIG. 4 is a perspective view illustrating another example of the fixed rod among components of the pump of the integrated brake system in accordance with one embodiment of the present invention;

FIGS. 5(a) and 5(b) are cross-sectional views of the fixed rod of FIG. 4;

FIGS. 6(a) to 6(c) are views illustrating an example of a process of assembling a piston head with a spindle among components of the pump of the integrated brake system in accordance with one embodiment of the present invention; and FIGS. 7(a) to 7(c) are views illustrating another example of the process of assembling the piston head with the spindle among components of the pump of the integrated brake system in accordance with one embodiment of the present invention.

DETAILED DESCRIPTION OF EXEMPLARY EMBODIMENTS

Figure 1:
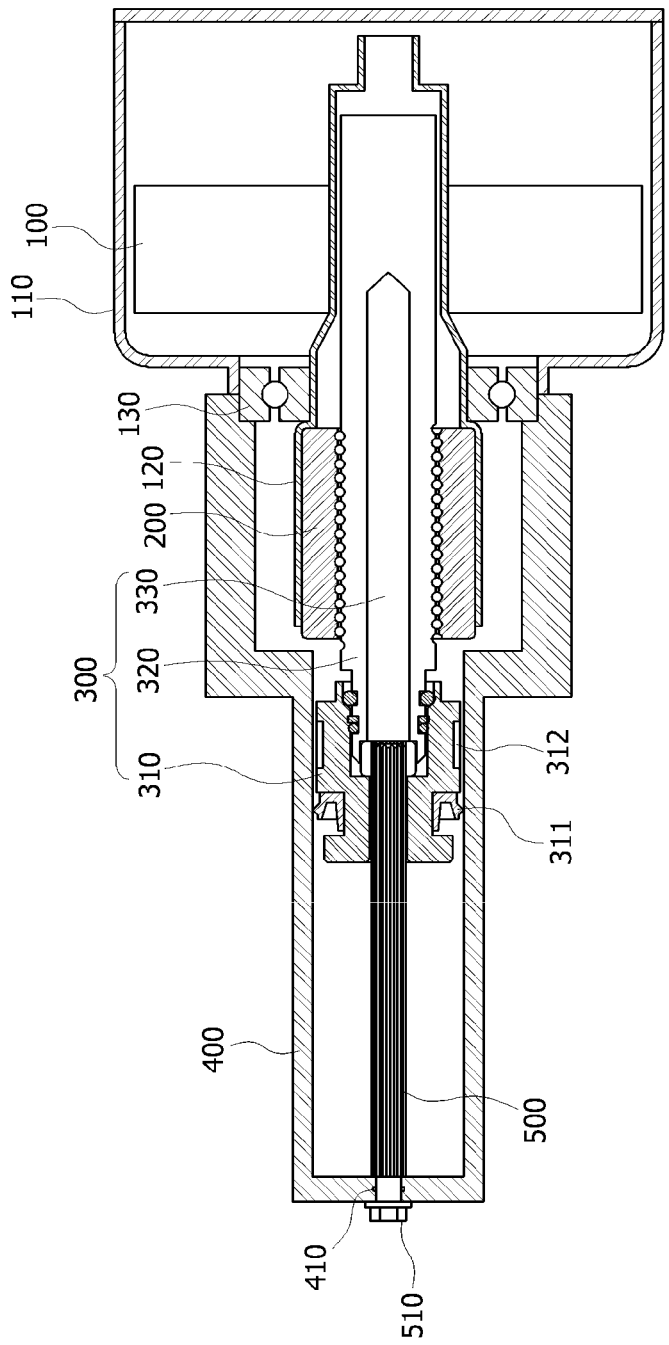
FIG. 1 is a cross-sectional view of a pump of an integrated brake system in accordance with one embodiment of the present invention.

Exemplary embodiments of the present invention will be described with reference to the drawings. Throughout the specification, like reference numerals designate like elements and a repetitive description thereof will be omitted.

Also, when it is determined that a detailed description of publicly known related art may make the points of the present embodiment unclear, the detailed description thereof will be omitted. Also, it should be understood that the attached drawings are merely to allow the concept of the present invention to be easily understood and the concept of the present invention is not limited by the attached drawings.

Hereinafter, referring to FIGS. 1 to 5(b), a pump of an integrated brake system in accordance with one embodiment of the present invention will be described. FIG. 1 is a cross-sectional view of the pump of the integrated brake system in accordance with one embodiment of the present invention. FIGS. 2 to 3(b) are a perspective view and cross-sectional views illustrating an example of a fixed rod among components of the pump of the integrated brake system in accordance with one embodiment of the present invention. FIGS. 4 to 5(b) are a perspective view and cross-sectional views illustrating another example of the fixed rod among components of the pump of the integrated brake system in accordance with one embodiment of the present invention.

The pump of the integrated brake system in accordance with one embodiment of the present invention, as shown in FIG. 1, includes a motor 100, a nut 200, a piston assembly 300, a piston housing 400, and a fixed rod 500.

The motor 100 is a component which receives power to rotate. An electronic control unit (ECU) controls an operation of the motor 100 based on an external environment or a pressure applied by a user onto a brake pedal. A hollow is formed in the motor 100, and a rotor 120 is disposed in the hollow. Accordingly, when the motor 100 operates, the rotor 120 formed in the hollow of the motor 100 is allowed to rotate. Also, the motor 100 may include a motor housing 110 for accommodating and protecting internal components thereof and four-point contact bearings 130 disposed between the motor housing 110 and the rotor 120.

The nut 200 is a component which rotates based on the rotation of the motor 100. In detail, the rotor 120 is disposed in the hollow of the motor 100 and rotates when power is applied to the motor 100. The nut 200 also rotates based on the rotation of the rotor 120. A hollow is formed in the nut 200 and the piston assembly 300 which will be described below is inserted into the nut 200, thereby ball-screw-coupling the nut 200 with the piston assembly 300. That is, a groove corresponding to a screw thread formed on an inside of the nut 200 is formed on an outer circumferential surface of the piston assembly 300 and rotational power of the motor 100 may be converted into linear reciprocating movement by the ball-screw-coupling structure described above. In the end, the nut 200 and the groove formed on the outer circumferential surface of the piston assembly 300 perform a function of a gear unit which converts rotational movement of the motor 100 into linear movement. Meanwhile, a damping member may be disposed between the rotor 120 and the nut 200, through which vibrations of the motor 100 are prevented from being transferred to the nut 200 and the piston assembly 300, thereby protecting the piston assembly 300 when the motor 100 is overloaded.

The piston assembly 300 is a component disposed in the nut 200 and reciprocates when the nut 200 rotates based on the rotation of the motor 100. In case of the piston assembly 300, as shown in FIG. 1, the screw thread is formed on the inside of the nut 200 and a part of the piston assembly 300 coupled with the inside of the nut 200 includes a screw thread corresponding to the screw thread formed on the inside of the nut 200. Accordingly, when the nut 200 rotates, the piston assembly 300 is allowed to linearly reciprocate. Also, a coupling groove 330 is formed in the piston assembly 300 to allow the fixed rod 500 which will be described below to be inserted thereinto, which will be described below in detail.

Meanwhile, the piston assembly 300, in detail, includes a piston head 310 and a spindle 320. The piston head 310 is a component which generates hydraulic pressure by reciprocating a cylinder formed by the piston housing 400, which will be described below. The piston head 310 may include at least one sealing member 311 to prevent leakage of a fluid in the cylinder and a slip ring 312 on an outer circumferential surface thereof to smoothly reciprocate. The piston head 310 and the spindle 320 described above may be integrally formed or may be separately formed and mutually assembled to form the piston assembly 300, which will be described below in detail.

The piston housing 400 is a component which accommodates the piston assembly 300 and has one side coupled with the motor housing 110 which accommodates the motor 100 and the other side which forms the cylinder with the fluid accommodated therein to allow the piston head 310 to reciprocate and generate the hydraulic pressure. Meanwhile, coupling between the piston housing 400 and the motor housing 100 may be performed based on a location of the four-point contact bearing 130 described above. This is because the bearing 130 is accurately manufactured to precisely align the piston housing 400 with the motor housing 110. Through this, since it is possible to provide a precise linear path when the piston assembly 300 reciprocates, when the piston assembly 300 reciprocates in the cylinder, damage to an inner wall of the cylinder may be minimized and hydraulic pressure may be efficiently generated at the same time.

The fixed rod 500 is a component fixed in the piston housing 400 in a longitudinal direction. As described above, since the fixed rod 500 is inserted into the coupling groove 330 formed in the piston assembly 300, the piston assembly 300 is allowed to linearly reciprocate in the pump along the fixed rod 500. Through this, it is possible to provide reciprocating linearity of the piston assembly 300. Also, the coupling groove 330 is formed in the piston assembly 300 to allow the fixed rod 500 to be inserted thereinto and to slide. The coupling groove 330, as shown in FIG. 1, may extend to the hollow of the motor 100. Through this, since it is possible to reduce a size of the pump and to provide a reciprocating distance of a piston to generate full hydraulic pressure, a vehicle-mounting property may be increased.

In addition, it is necessary to fix the fixed rod 500 to the piston housing 400. Here, the fixed rod 500 and the piston housing 400 may be integrally formed together or separately manufactured and fixed by coupling therebetween. Particularly, as shown in FIG. 1, a through hole may be formed in the other side of the piston housing 400 to allow the fixed rod 500 to be inserted thereinto and coupled therewith and a portion of the fixed rod 500 which passes through the through hole and is exposed may be coupled with an additional fixing member 510 to fix the fixed rod 500 to be fixedly coupled with the piston housing 400. For this, a screw thread is formed on an outer circumferential surface of the portion of the fixed rod 500 which passes through the through hole and is exposed and a nut member is used as the fixing member 510, thereby screw-fastening both components to be coupled and fixed to each other. Also, an O-ring 410 for effectively supporting the fixed rod 500 may be disposed at the through hole. However, in case of the coupling described above, it is necessary to dispose an additional sealing member to prevent the leakage of the fluid accommodated in the piston housing 400 from the through hole.

Meanwhile, as described above, the spindle 320 is ball-screw coupled with the nut 200 and linearly reciprocates based on the rotation of the nut 200. Here, when the spindle 320 rotates along with the nut 200, the piston assembly 300 is not allowed to smoothly reciprocate in the cylinder. To prevent this, a cross section of the fixed rod 500 may not be formed in a circular shape and a cross section of the coupling groove 330 of the piston assembly 300 may be formed corresponding to the shape of the cross section of the fixed rod 500. In detail, as shown in FIGS. 2 and 3, the cross section of the fixed rod 500 is formed in a polygonal shape and the coupling groove 330 is formed corresponding thereto. When the fixed rod 500 and the coupling groove 330 are formed as described above and the spindle 320 rotates based on the rotation of the nut 200, as shown in FIG. 3(b), an inner wall of the coupling groove 330 formed in the spindle 320 is in contact with the fixed rod 500, thereby preventing the piston assembly 300 from further rotating. In addition, as shown in FIGS. 4 to 5(b), when the cross section of the fixed rod 500 is formed to include a plurality of protrusions and the coupling groove 330 is formed corresponding thereto, an allowable radius of rotation of the piston assembly 300 may be further reduced compared with the example of the fixed rod 500 shown in FIGS. 2 to 3(b).

Meanwhile, the piston assembly 300 in the pump of the integrated brake system in accordance with one embodiment of the present invention includes the piston head 310 and the spindle 320 as described above, both of these components may be integrally manufactured to form the piston assembly 300 but may be separately manufactured and then assembled with each other to form the piston assembly 300. Hereinafter, referring to FIGS. 6(a) to 7(c), examples of assembling the piston head 310 with the spindle 320 in the integrated brake system in accordance with one embodiment of the present invention will be described. FIGS. 6(a) to 6(c) are views illustrating an example of a process of assembling the piston head 310 with the spindle 320 among the components of the pump of the integrated brake system in accordance with one embodiment of the present invention. FIGS. 7(a) to 7(c) are views illustrating another example of a process of assembling the piston head 310 with the spindle 320 among the components of the pump of the integrated brake system in accordance with one embodiment of the present invention.

As shown in FIGS. 6(a) to 6(c), the piston assembly 300 in the pump of the integrated brake system in accordance with one embodiment of the present invention includes the piston head 310 and the spindle 320. An insertion groove is formed in one side of the piston head 310, and a holding protrusion is formed on an inner circumferential surface, that is, one side of the insertion groove. Also, a coak portion 313 formed with a small thickness is formed at an end of the piston head 310 in a direction in which the spindle 320 is to be inserted as shown in FIG. 6(a). Meanwhile, a ring member 322 such as a C-ring or O-ring is disposed on an outer circumferential surface of the spindle 320, and as shown in FIG. 6(b), the spindle 320 is inserted into the insertion groove of the piston head 310. The coak portion 313 is compressed inward while the ring member 322 is held by the holding protrusion and not further inserted, thereby coak-coupling the piston head 310 with the spindle 320 to fixedly couple both components, which may be checked in detail with reference to FIG. 6(c) which is an enlarged view of a part shown in FIG. 6(b). In addition, to prevent the fluid in the cylinder from leaking into the spindle 320 and the motor 100 after coupling, an additional sealing member 323 may be further disposed on the outer circumferential surface of the spindle 320.

In another example of the process of assembling the piston head 310 with the spindle 320 among components of the pump of the integrated brake system shown in FIGS. 7(a) to 7(c), like the example of the assembling process shown in FIGS. 6(a) to 6(c), the spindle 320 including the outer circumferential surface on which the ring member 322 is disposed is inserted into the insertion groove of the piston head 310. However, unlike the example of the assembling shown in FIGS. 6(a) to 6(c), a holding groove 315 is formed in an inner circumferential surface of the piston head 310 and the spindle 320 is inserted into the insertion groove until the ring member 322 is held by the holding groove 315, thereby fixedly coupling the spindle 320 with the piston head 310.

Meanwhile, a rotation-preventing plate 340 may be disposed between the piston head 310 and the spindle 320. In detail, the rotation-preventing plate 340 is disposed in the insertion groove formed in the piston head 310 and includes a hole corresponding to the cross section of the fixed rod 500. Also, an accommodation groove 321 capable of accommodating the rotation-preventing plate 340 is formed at one side of the spindle 320. When configured as described above, it is unnecessary to accurately process the entire through hole formed lengthwise in the spindle 320 in the longitudinal direction to correspond to the cross section of the fixed rod 500. Also, since it is necessary to accurately process only the hole formed at the rotation-preventing plate 340, processing costs may be reduced.

In case of the pump of the integrated brake system in accordance with one embodiment of the present invention described above, the gear unit which converts the rotational movement of the motor 100 into the linear movement has been described as an example of ball-screw coupling. However, another power conversion method may be available. In detail, when the motor 100 is not a hollow type motor, the gear unit may include a worm shaft coaxially connected to a rotating shaft of the motor 100, a worm wheel which is engaged with the worm shaft and rotates based on rotation of the worm shaft, a pinion disposed coaxially with the worm wheel, and a rack bar which is engaged with the pinion and linearly reciprocates based on rotation of the pinion.

The rack bar may be separately formed from the piston assembly 300 described above and coupled by assembling both components or may be integrally formed. Through the components of the gear unit described above, the respective components in the integrated brake system can be freely arranged, and the vehicle mounting property and the degree of freedom in design can be secured.

In accordance with one embodiment of the present invention, a pump of an integrated brake system can reduce a size of the integrated brake system by disposing a nut in a hollow inside of a motor and coupling the nut with a piston in a ball-screw method to allow the piston to linearly reciprocate in the cylinder when the nut rotates.

Also, a fixed rod is disposed in the cylinder and a coupling groove into which the fixed rod is inserted is formed in the piston to provide linear reciprocating movement of the piston, thereby preventing an inner wall of the pump from being damaged and allowing the piston to smoothly move.

The effects of the present invention are not limited to the above disclosure. Additional effects not stated above may become apparent to those of ordinary skill in the art based on the following descriptions.

The embodiments described above and the attached drawings are merely examples of the technical concept of the present invention. Accordingly, since the embodiments described above are not to limit but to explain the technical concept of the present invention, it is obvious that the scope of the technical concept of the present invention is not limited thereto. It will be understood by those of ordinary skill in the art that various changes in form and details may be made therein without departing from the scope of the technical concept of the present invention as defined by the following claims.

What is claimed is:

1. A pump of an integrated brake system, comprising:
a motor;
a gear unit which converts a rotating force of the motor into linear reciprocating movement;
a piston assembly which is connected to the gear unit and reciprocates based on power conversion of the gear unit;
a piston housing which accommodates the piston assembly; and
a fixed rod fixedly disposed in the piston housing in a longitudinal direction,
wherein the piston assembly comprises a coupling groove formed therein, into which the fixed rod is inserted,
wherein the piston assembly comprises a piston head, a spindle, and a rotation-preventing ring disposed between the piston head and the spindle to prevent rotation of the piston assembly, and
wherein the piston head is configured to reciprocate in a cylinder formed in the piston housing, the spindle has one side inserted into and coupled with an insertion groove formed in one side of the piston head, and a ring member is disposed on an outer circumferential surface of the spindle.

2. The pump of claim 1, wherein the piston housing comprises a through hole formed in an end thereof to allow the fixed rod to be inserted thereinto and coupled therewith.

3. The pump of claim 2, further comprising a fixing member which is coupled with a portion of the fixed rod which passes through the through hole and is exposed to fix the fixed rod.

4. The pump of claim 1, wherein a cross section of the fixed rod is formed in a polygonal shape, and
wherein the coupling groove is formed corresponding to the cross section of the fixed rod.

5. The pump of claim 1, wherein a hollow is formed in the motor,
wherein the gear unit comprises a nut which is restricted by and coupled with a rotor of the motor and rotates based on rotation of the rotor, and
wherein the piston assembly is disposed in the nut and reciprocates based on rotation of the nut.

6. The pump of claim 5, wherein the motor is coupled with one side of the piston housing and a through hole is formed in the other side of the piston housing.

7. The pump of claim 5, further comprising:
a motor housing which accommodates the motor; and
a four-point contact bearing disposed between the motor housing and the rotor.

8. The pump of claim 7, wherein the motor housing and the piston housing are assembled based on a position of the four-point contact bearing.

9. The pump of claim 5, wherein:
the spindle is screw-coupled with the nut.

10. The pump of claim 9, wherein a holding protrusion is formed on an inner circumferential surface of the piston head, and wherein the spindle is inserted into the insertion groove until the ring member is held by the holding protrusion and then coak-coupled with one side of the piston head to fix the spindle to the piston head.

11. The pump of claim 9, wherein a holding groove is formed in an inner circumferential surface of the piston head, and wherein the spindle is inserted into the insertion groove until the ring member is held by the holding groove to fix the spindle to the piston head.

12. The pump of claim 9, wherein the rotation-preventing ring is disposed in the insertion groove and formed corresponding to the fixed rod, and wherein the spindle comprises an accommodation groove formed in one side thereof, Which accommodate the rotation-preventing ring.

13. The pump of claim 1, wherein the rotation-prevention ring has a shape corresponding to the fixed rod so that the fixed rod prevents the rotation of the piston assembly.

14. The pump of claim 1, further comprising:
a motor housing accommodating the motor; and
a bearing disposed between the motor housing and the piston housing.

* * * * *